Jan. 27, 1953    O. M. BURKHARDT    2,626,560
PRESSURE COOKER

Filed May 16, 1947    2 SHEETS—SHEET 1

Inventor
Otto M. Burkhardt
By
Milburn & Milburn
Attorneys

Jan. 27, 1953   O. M. BURKHARDT   2,626,560
PRESSURE COOKER
Filed May 16, 1947   2 SHEETS—SHEET 2

Inventor
Otto M. Burkhardt
By
Milburn & Milburn
Attorneys

Patented Jan. 27, 1953

2,626,560

UNITED STATES PATENT OFFICE 2,626,560

PRESSURE COOKER

Otto M. Burkhardt, Euclid, Ohio

Application May 16, 1947, Serial No. 748,377

2 Claims. (Cl. 99—319)

This invention pertains to the art of pressure cookers and reference is had to my co-pending patent application Serial No. 626,873, filed November 5, 1945, now Patent No. 2,598,220, of which the present application is a continuation-in-part, and a companion application Serial No. 748,378, filed May 16, 1947.

The general object of my present invention is to devise a new form of utensil for the preparation of beverages.

A more specific object is to devise a simple and efficient apparatus suitable for the preparation of beverages in pressure cookers from roots, herbs, leaves or beans, as for instance tea and coffee.

Another object is to devise such apparatus that can be sealed to permit cooking under pressure and that accommodates an inner holder to serve as part of an auxiliary sealing means for the appliance.

A further object is to devise such an appliance that performs in conjunction with the walls of the same, certain functions which are essential for the efficient preparation of beverages from roots, herbs, leaves or beans, as for instance the circulation of liquid.

Experience has shown that the less volatile oils of roasted coffee beans enhance the quality of the beverage and these less volatile oils may dissolve more readily at temperatures higher than 212 degrees Fahrenheit; and it has been found also that pressure helps to penetrate the cellular structure of beans, herbs and roots or parts thereof and that agitation of the liquid, causing more active contact with the substance from which the beverage is to be derived, further facilitates the infusion of the flavoring portions and aromatic oils from the substantial particles into the liquid. Pressure cookers normally permit of elevated temperatures at pressure above that of the atmosphere and, with my present form of device, effective agitation within the utensil is ensured.

It is to be understood that the present form of disclosure is merely for the purpose of illustration and that there might be other modifications.

Figure 2:
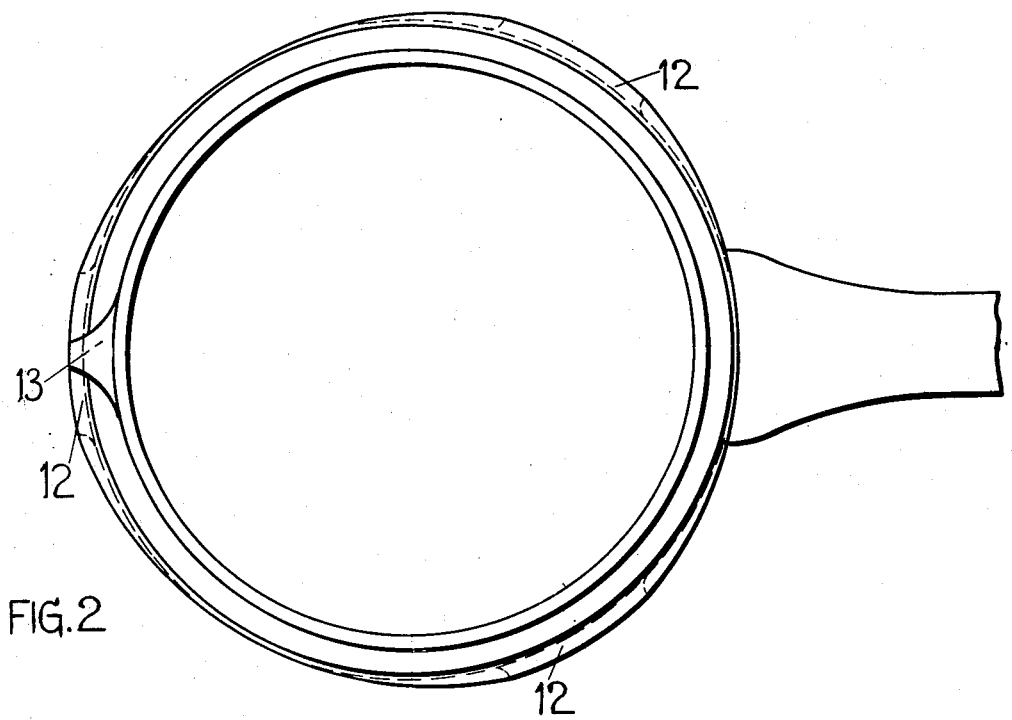
Fig. 2 is a top plan view of the container alone.
Figure 1:
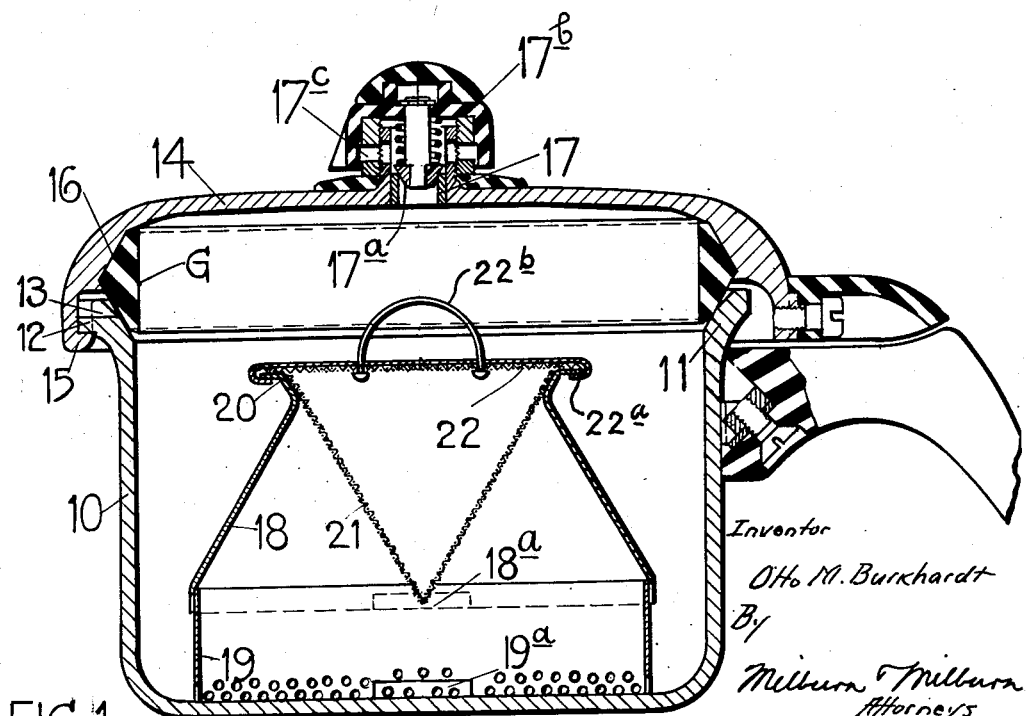
Fig. 1 is a sectional view of one form of my present invention.
Figure 6:
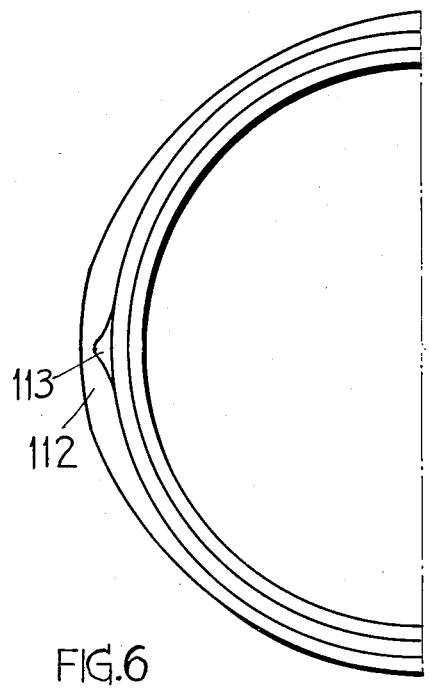
Fig. 6 is a top plan view of the container alone in Fig. 4.
Figure 3:
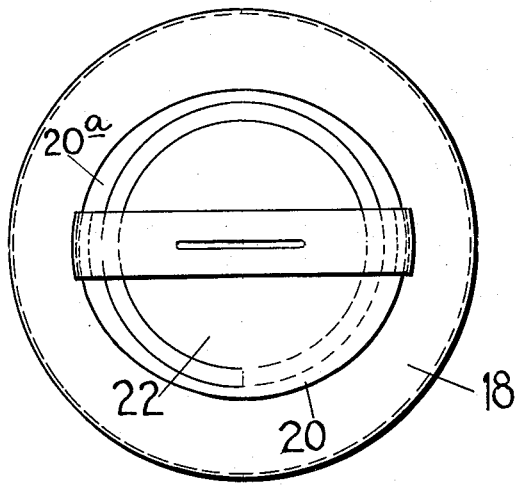
Fig. 3 is a top plan view of a part of the first form of device.

Referring first to the form of device shown in Fig. 1 hereof, the container 10 is provided with a rim 11 at its open end, this rim being for the purpose of providing sealing surfaces of various angularity. Farther toward the periphery of the rim, it is provided with a plurality of ledges 12 which serve for anchoring the cover to the container. One of these ledges is preferably located opposite the handle and is provided with a depression 13 for conveniently dispensing the beverage. It may be noted that this depression does not extend far enough inward to interfere with the sealing surfaces. The particular structure and arrangement of the gasket and the sealing surfaces therefor, as well as the co-operation of the pouring depression 13 therewith, are more fully set forth in my companion application Serial No. 748,378, above referred to. As to the preparation of beverages, with which we are concerned in the present application, I am not restricted to the use of one specific form of gasket although the particular sealing means and the arrangement of the depression 13, as more fully set forth in my companion application referred to above, may be employed in the present device with marked advantage. The gasket in the present illustration is indicated in a general way by reference letter G.

The cover 14 is provided at its periphery with ledges 15 for locking engagement with the companion ledges 12 on the container so as to secure the cover thereupon, as more fully explained in my companion application Serial No. 748,378, above referred to. The present invention is not limited to any particular form of cover-locking means but any suitable means may be adopted for this purpose.

In the center of the cover 14 there is located a combination valve which serves the purpose of pressure control and safety vent. This is substantially the same as that disclosed in my copending application No. 654,001 and comprises essentially a spring-pressed valve 17a adapted to engage the valve seat 17 and the screw-threaded cap 17b which carries the valve, with abutment for its spring, and has a depending skirt to deflect escaping steam or vapor out through the lateral openings 17c.

In the form of device shown in Fig. 1 the larger part of the container bottom is covered by the large end of a funnel 18 which is here shown as resting upon the container bottom through the intermediary cylindrical portion 19. This portion 19 is removable so that the height of the funnel may be varied. Both the funnel and cylindrical portion have openings 18a and 19a to facilitate circulation. The upper or smaller part of the funnel 18 is provided with an eccentric rim 20 into which fits a foraminous holder 21 for the purpose of holding the material from which the beverage is to be prepared. If it be desired to position holder 21 at a lower level, then the intermediary cylindrical portion 19 may be removed.

The holder 21 and its cover 22 are foraminous in order to permit circulation therethrough and at the same time to retain the material from which the flavoring of the beverage is to be derived by such circulation.

The cover 22 may have diametrically opposed down-turned ears 22a for locking engagement with the enlarged portions of the eccentric rim 20 in a manner similar to a bayonet lock. Handle 22b may also be provided for cover 22.

When heat is applied to the bottom of container 10, this heat will be transferred preponderantly to the liquid confined within the funnel 18. The vapor which is formed during the process, is directed by the walls of the funnel towards and through the holder 21, thereby washing the material therewithin. The circulation so established causes an effective infusion for the preparation of the beverage. There are involved several phenomena in the inducing of this process in a hermetically sealed container. First, the generated vapor displaces the air from the utensil and at the same time induces circulation. Then, upon reaching the boiling point, very active agitation and consequently speedy infusion take place with the atmosphere excluded. This alone is a desirable feature for the preparation of beverages. Then, if the pressure selector is set at any desired pressure, the same process can be repeated with the further singular advantage resulting from the fact that elevated temperature and pressure greatly aid the process of infusion. It will be noted that, by means of pressure selector 17, any desired pressure can be chosen for the preparation of the beverage. This has also the following advantage. If coffee be desired from whole beans or coarsely ground beans, then a high pressure is selected for the preparation. When finely ground coffee beans are used, then a lower pressure will give a satisfactory beverage. In either case, circulation and consequent agitation are essential for best results.

Figure 4:
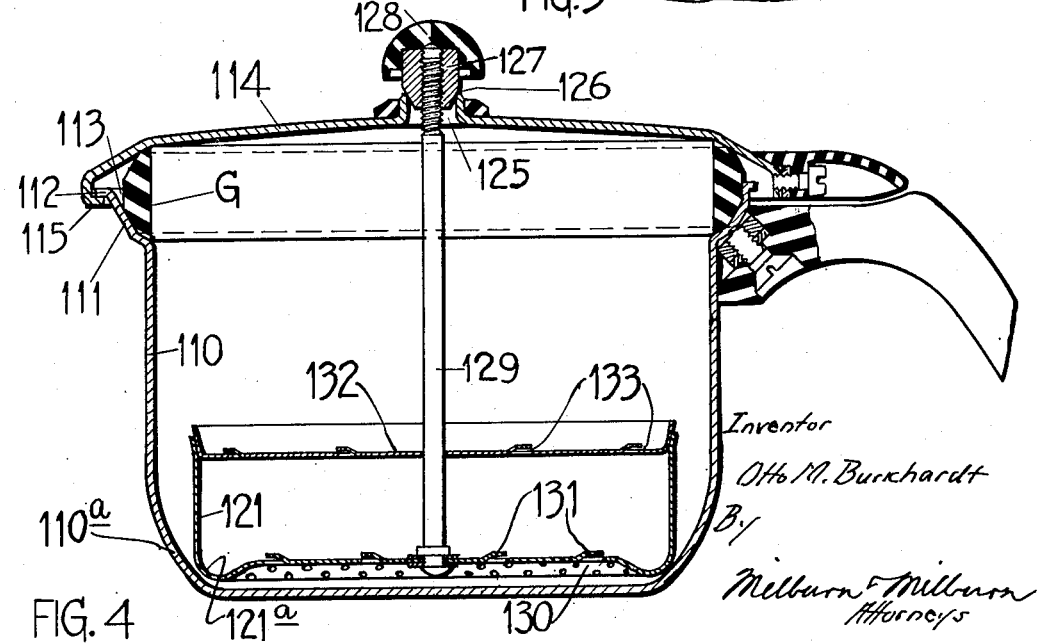
Fig. 4 is a sectional view of another form of my invention.

A simplified form of pressure cooker for preparation of beverages is disclosed in Fig. 4 hereof. The container 110 is provided at its open end with a rim 111. This rim, like that of Fig. 1, serves several purposes, as more fully set forth in my companion application above noted. Suffice to state here, the rim 111 has a plurality of ledges 112 for anchoring the cover to the container; and one of these ledges, opposite the handle, is provided with a depression 113 which may serve for pouring the beverage. The cover is indicated by reference numeral 114, and has ledges 115 for locking engagement with the ledges 112 of the container.

Figure 5:
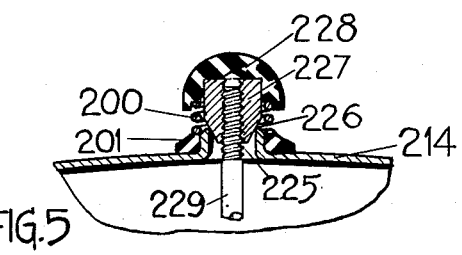
Fig. 5 shows a modified form of the device shown in Fig. 4.

In the center of the cover 114 there is an opening 125 which has a smooth circular edge 126. Upon this edge there rests a conical nut 127, the upper end of which is securely held in a heat-insulating knob 128. To the bottom of holder 121 there is attached a rod 129 which is threaded at its upper end. If nut 127 is turned on rod 129, then the holder 121 is lifted slightly off of the bottom of the utensil 110 and the conical surface of the nut 127 rests upon the edge 126. In this position, the weights of the holder 121, rod 129, nut 127, and knob 128 all rest in sealing relationship upon edge 126 of the opening 125 and consequently seal the internal pressure until the generated pressure within the utensil equals the weight of the above-mentioned assembly. If the weight of this assembly be too great, then it may be desirable to resort to spring means, as illustrated in Fig. 5 hereof, in which case, the rod 229 performs the same function as rod 129 in Fig. 4. However, located within the knob 228 there is a spring 200 which rests upon an annular member 201. Then, when nut 227 is screwed to rod 229, some or all of the weight of the above assembly rests upon spring 200 and only the balance of the weight hermetically seals the utensil. For variations as may be desired according to the amount of pressure desired, the height of the annular member 201 may be varied.

I will now refer to the holder 121 which is shown in Fig. 4 and which may be employed in carrying out the invention herein set forth. Located centrally within the container 110, the bottom of this holder is recessed upwardly so as to provide the space 130 between it and the bottom of the container 110; and the bottom of this holder is perforated by the louvres 131 so that vapor released within the space 130 will facilitate the circulation of liquid through the holder. The cover of the holder, which cover is indicated by reference numeral 132, is also perforated by the louvres 133 so that circulation of liquid may proceed freely through the holder. The rod 129 is attached to the center of the bottom of the holder and serves as a means of lifting the holder with its cover out of the container 110. The holder is spaced from the side wall of the container 110 and it will be noted that the curved side wall 121a of the holder fits within a tapered portion 110a which is provided where the bottom of the container 110 blends into the side wall thereof. Thus, the vapor will be forced into and through the holder 121 and circulation will thereby be established therethrough. If the vapor pressure should suffice to lift the holder temporarily, then the conical portion 110a of the container 110 will guide it back into central position if the vapor pressure has expended itself.

It is to be understood that in both forms of holders herein disclosed, if coffee either ground or unground or tea leaves or the like are placed in the holder, the circulation of liquid through the holder will facilitate the desired infusion without substantial particles becoming admixed with the resulting beverage.

It is to be understood also that in the form of device illustrated in Fig. 5 hereof, the same form of holder may be attached to the rod 229 as is shown attached to the rod 129 in Fig. 4 hereof.

I will explain that the utensil can be simplified if only one specific pressure be required within the utensil, it being a fact that very high pressure is not required for many beverages and some foods. Thus the comparatively elaborate means for the selection of various internal pressures may not be required. Accordingly, the simplified valve means shown in Figs. 4 and 5 hereof may be used with marked practical advantages in the preparation of beverages and some foods. Also, the vent passage through the center of the cover, may be made unusually large since there is no limit to the weight which may be attached to the rod 129 or 229. There is no danger of this passage becoming clogged because, in the very use of the device, this rod is inserted through the central passage of the seat 126 or 226 so that the vent is automatically cleaned by the use of the device. Another function of the rod 129 or 229 is to support the basket or holder for the coffee, tea leaves or the like as referred to herein.

I will now briefly describe the procedure in the use of my device as illustrated in Figs. 4 and 5 hereof. Coffee, ground or unground, herbs, roots or leaves are placed in the holder 121. The cover and sealing gasket are then placed in position upon the container, whereupon rod 129 or 229 projects through the central aperture in the cover. Nut 127 or 227 is then screwed onto the rod 129 or 229 until it abuts the knob 128 or 228, respectively. At that time the holder will be slightly raised from the bottom of the container 110, and the weight of the holder assembly serves to seal the utensil. As soon as vapor forms, expansion takes place within the utensil and the vapor exerts a lifting action upon the large area of the holder until the pressure is equalized. The vapor also tends to displace the air from the utensil so that the infusion takes place in the liquid from which the atmosphere is excluded.

Very marked practical advantages result from my invention as herein set forth. My present method of preparing beverages has proved so efficient that it is possible even to prepare coffee from the beans without grinding; and the same efficiency may be realized also in the preparation of other beverages, as for instance those made from herbs. It has been found that at temperatures considerably above the boiling point of water, the desired volatile oils may be more readily extracted from the coffee beans or the like. Also, pressures above that of the atmosphere, commonly obtained in pressure cookers, facilitate the penetration of the bulky particles to such an extent that whole coffee beans from the roaster may be used in such form for making a beverage therefrom. This means that it is possible to obtain two very desirable results. First, none of the natural coffee flavor is lost by the usual grinding process or afterwards, but it is all retained. Second, there results a perfectly clear beverage which is saturated with only the desirable volatile oil which carries the natural coffee flavor and is free of the colloidal parts of the coffee without the necessity of filtering. Thus I am able to retain only the desirable parts of the coffee and to discard the bulk which remains in the coffee holder forming a part of my present appliance; and the same thing is true of other beverages which may be made in the same manner and with the same resultant practical advantages.

Furthermore, with my present new device, it may be possible to prepare coffee from coffee beans that are only partially roasted or not at all roasted when placed in my present appliance. In other words, my present device permits the application of such high temperatures that the roasting of the coffee bean may be completed or performed entirely while the beverage is being prepared therefrom in my new appliance. That is, the partially roasted or entirely green coffee beans may be subjected to what may be considered as "wet-roasting" and brewing at the same time in my present device. All of the desirable substances, containing the natural flavor of the coffee, are captured at once and are retained and none of the natural flavor is lost in the use of my present invention.

What I claim is:

1. A cooking utensil comprising a container with an opening only at the top thereof, a separate closure for said opening, an annular sealing gasket arranged between said closure and container for sealing engagement therebetween, said closure having a centrally disposed vent, a perforated holder of predetermined weight located within said container, said holder having a centrally disposed rigid stem extending upwardly into said vent and having provided directly thereupon a sealing cap for effective engagement within said vent for sealing the same, the effective weight of said holder with material therewithin to be treated being sufficient to hold said sealing cap in sealing position up to only the predetermined point of intended relief of internal pressure.

2. The same structure as recited in claim 1 hereof and in which there is a vertically adjustable means of connection between said sealing cap and said stem.

OTTO M. BURKHARDT.

REFERENCES CITED

The following references are of record in the file of this patent:

UNITED STATES PATENTS

| Number | Name | Date |
|---|---|---|
| 285,972 | Cochran | Oct. 2, 1883 |
| 655,410 | Mulkerins | Aug. 7, 1900 |
| 1,127,780 | Konar | Feb. 9, 1915 |
| 1,196,086 | Cox | Aug. 29, 1916 |
| 1,424,774 | Pearl | Aug. 8, 1922 |
| 1,552,565 | Morton et al. | Sept. 8, 1925 |
| 2,103,704 | Wygodsky | Dec. 28, 1937 |
| 2,302,698 | Kessel | Nov. 24, 1942 |

FOREIGN PATENTS

| Number | Country | Date |
|---|---|---|
| 8,706 | Great Britain | A. D. 1910 |
| 419,796 | France | Nov. 4, 1910 |